(12) United States Patent
Papanikolaou et al.

(10) Patent No.: US 7,216,326 B2
(45) Date of Patent: May 8, 2007

(54) RESOURCE ACTIVITY AWARE SYSTEM FOR DETERMINING A RESOURCE INTERCONNECTION PATTERN WITHIN AN ESSENTIALLY DIGITAL DEVICE AND DEVICES CREATED THEREWITH

(75) Inventors: Antonis Papanikolaou, Athens (GR); Hua Wang, Leuven (BE); Jin Guo, Leuven (BE); Miguel Miranda, Kessel-Lo (BE); Francky Catthoor, Temse (BE)

(73) Assignee: Interuniversitar Microelektronica Centrum (IMEC), Leuven (BE)

( * ) Notice: Subject to any disclaimer, the term of this patent is extended or adjusted under 35 U.S.C. 154(b) by 210 days.

(21) Appl. No.: 10/872,966

(22) Filed: Jun. 21, 2004

(65) Prior Publication Data

US 2005/0060679 A1     Mar. 17, 2005

Related U.S. Application Data

(60) Provisional application No. 60/580,788, filed on Jun. 18, 2004.

(30) Foreign Application Priority Data

Jun. 20, 2003    (EP)    ................................. 03447162

(51) Int. Cl.
*G06F 17/50*    (2006.01)
*G06F 9/45*    (2006.01)

(52) U.S. Cl. ............................................ 716/14; 716/9
(58) Field of Classification Search ................... 716/4, 716/2, 6, 7, 8, 18; 714/6; 438/14
See application file for complete search history.

(56) References Cited

U.S. PATENT DOCUMENTS 6,338,972 B1 *   1/2002   Sudhindranath et al. ....... 438/14
6,493,863 B1 * 12/2002   Hamada et al. ................ 716/18
6,622,287 B1 *   9/2003   Henkel ............................ 716/2

OTHER PUBLICATIONS

Liu, et al., Power Consumption Estimation in CMOS VLSI Chips, IEEE Journal of Solid-State Circuits, vol. 29, No. 6, Jun. 1994.

(Continued)

*Primary Examiner*—Leigh M. Garbowski
(74) *Attorney, Agent, or Firm*—Knobbe Martens Olson & Bear LLP

(57) ABSTRACT

An aspect of the present invention provides a design environment in which a floorplan of a semiconductor device is optimised by taking into account activation or access frequency information to and from resources. Since segmented bus architecture is also a good alternative approach for the power consumption of the network, the floorplanning approach for energy optimization of the communicating network is adapted for such architectures in embodiments of the present invention. The provided method comprises both architecture optimizations as well as physical design optimizations.

18 Claims, 6 Drawing Sheets

U.S. PATENT DOCUMENTS

| | | | | |
|---|---|---|---|---|
| 6,668,337 | B2* | 12/2003 | Takahashi et al. | 714/6 |
| 6,684,373 | B1* | 1/2004 | Bodine et al. | 716/6 |
| 2002/0004927 | A1 | 1/2002 | Takahashi et al. | |
| 2002/0069396 | A1* | 6/2002 | Bhattacharya et al. | 716/7 |
| 2003/0115564 | A1* | 6/2003 | Chang et al. | 716/8 |
| 2004/0019859 | A1* | 1/2004 | Ravi et al. | 716/4 |
| 2004/0068711 | A1* | 4/2004 | Gupta et al. | 716/18 |

OTHER PUBLICATIONS

Cong, Jason, An Interconnect-Centric Design Flow for Nanometer Technologies, Proceedings of the IEEE, vol. 89, No. 4, Apr. 2001.

Benini, et al., Layout-Driven Memory Synthesis for Embedded Systems-on-Chip, IEEE Transactions on Very Large Scale Integration (VLSI) Systems, vol. 10, No. 2, Apr. 2002.

Meeuwen, et al., System-level Interconnect Architecture Exploration for Custom Memory Organizations, ISSS'01, Oct. 1-3, 2001.

Wang, et al., A global bus power optimization methodology for physical design of memory dominated systems by coupling bus segmentation and activity driven block placement.

Jayapala, et al., A Low Energy Clustered Instruction Memory Hierarchy for Long Instruction Word Processors.

VLSI Physical Design Automation, Circuit Partitioning, pp. 43-50.

Grun, et al., Memory System Connectivity Exploration, Proceedings of the 2002 Design, Automation and Test in Europe Conference and Exhibition.

Coudert, Olivier, Gate Sizing for Constrained Delay/Power/Area Optimization, IEEE Transactions on Very Large Scale Integration (VLSI) Systems, vol. 5, No. 4, Dec. 1997.

Benini, et al., System-Level Power Optimization: Techniques and Tools, Association for Computing Machinery, Inc., 2000.

Benini, et al., "System-level power optimization: techniques and tools," IEEE 1999 International Symposium on Low Power Electronics and Design, pp. 288-293, (1999).

Chen, et al., "Segmented bus design for low-power systems," IEEE Transaction on Very Large Scale Integration (VLSI) Systems, vol. 7, No. 1, pp. 25-29, (Mar. 1999).

Hu, et al., "System-level point-to-point communication synthesis using floorplanning information," Proceedings on the 15th International Conference on VLSI Design, pp. 573-579, (Jan. 7, 2001).

Jone, et al., "Design theory and implementation for low-power segmented bus systems," ACM Transaction on Design Automation of Electronic Systems, vol. 8, No. 1, pp. 38-54, (Jan. 2003).

Prabhakaran, et al., "Simultaneous scheduling, binding and floorplanning of interconnect power optimization," 12th International Conference on VLSI Design, pp. 423-427, (Jan. 7, 1999).

Shiue, et al., "Low power memory design," Proceedings of the IEEE International Conference on Application-Specific Systems, Architectures, and Processors, pp. 55-64, (Jul. 17, 2002).

Zhong, et al., "Interconnect-aware high-level synthesis for low power," IEEE/ACM International Conference on Computer Aided Design, pp. 110-117, (Nov. 10, 2002).

European Search Report dated Jul. 1, 2005, for European Application No. EP 04447147.2.

* cited by examiner

RESOURCE ACTIVITY AWARE SYSTEM FOR DETERMINING A RESOURCE INTERCONNECTION PATTERN WITHIN AN ESSENTIALLY DIGITAL DEVICE AND DEVICES CREATED THEREWITH

RELATED APPLICATIONS

This file claims priority to European application no. EP 03447162 (I2502-EP), filed Jun. 20, 2003, and further claims priority to U.S. application Ser. No. 10/128629 (IMEC246.001AUS), filed Apr. 22, 2002, claiming priority to U.S. application Ser. No. 60/285822, filed Apr. 23, 2002, which are all hereby fully incorporated by reference. This application further claims priority to U.S. provisional application 60/580788 with title "Power-Aware Configurable Bus Driving Circuits", filed on Jun. 18, 2004, which is hereby fully incorporated by reference.

FIELD OF THE INVENTION

The invention relates to the field of apparatus and methods for the design of digital systems, especially semiconductor devices and more in particular the step of so-called physical design, also denoted floorplanning.

BACKGROUND OF THE INVENTION

Currently, the semiconductor industry is continuing to develop and implement smaller technology nodes, enabling a host of new and more powerful applications. However, as technology sizes continue to decrease, interconnect, i.e. wiring layers joining elements of a semiconductor device, is becoming a main design constraint and dominate in terms of system power consumption and performance due to its poor scaling capabilities. As shown in [D. Liu, C. Svensson, *Power consumption estimation in CMOS VLSI chips*, IEEE J. Solid-State Circuits, vol. 29, no. 6, pp. 663–670, June 1994], interconnects consume a significant fraction of total circuit power. Moreover, global wire length, is becoming a major hindrance, since its relative delay to the gate delay deteriorates as technology continues to shrink. Hence, wire buffer insertion has become popular [J. Cong, *A interconnect-centric design flow for nanometer technologies*, Proc. IEEE, vol. 89, no. 4, pp. 505–528, April 2001.]. However, this in turn has increased the portion of circuit power consumed by communication resources.

The memory communication network consists of a number of long wires. As a result its power consumption is becoming significant. The physical design plays an important role in power efficiency because the design determines the final wire length. Once the network influences the chip power consumption, the physical design should play an important role in power efficiency. As the first step of the physical design, floorplanning decides the relative position of the modules, so it is determining the interconnection cost to a large extent.

With the increasing of complexity of the VLSI chip, the physical design time also becomes longer. To get a layout in reasonable time, hierarchical floorplanning can contribute by cutting the solution space into smaller ones. In data dominated applications, the distributed memory organization distributes the application data into smaller memories, hence reduces the energy per access of each data elements [L. benini, L. Macchiarulo, A. Macii, M. Poncino, *Layout driven memory synthesis for embedded Systems-on-Chip*, IEEE Trans. on VLSI sysystems, vol. 10, no.2, April 2002].

However, more smaller memories means more blocks and more interconnections among the blocks. Hierarchical floorplanning is a good and fast solution to get the layout of the chip with a small overhead in power and delay. Another advantage is that it enables hard-IP reuse, which makes it very useful for incremental designs.

Most floorplanning strategies consider chip area and total wirelength as the optimization criteria. Although the interconnection cost has been paid more attention to, the activation frequencies of the wires are rarely taken into account at the physical design stage. However, in order to minimize the energy consumption of the communication network, the wire length of the most active wires has to be minimized.

In U.S. Pat. No. 6,668,337 B2 a method for designing integrated circuits based on a transaction analysing model is disclosed, wherein floorplanning steps are performed, in a context of power consumption optimisation.

SUMMARY OF CERTAIN INVENTIVE ASPECTS

One aspect of the present invention provides a method for determining an optimised resource interconnection pattern, e. g. as part of a physical design phase, within an essentially digital semiconductor device, the device comprising resources, said essentially digital device being represented by a representation describing the functionality of said digital device, said representation comprising transfers such as data transfers, the transfers being defined by their source resource and their destination resource, said method comprising: inputting a representation of the functionality of said essentially digital device, including the number and type of said resources and at least partial scheduling of said transfers; performing resource ordering to thereby generate topological relationships between the resources, based on the access activity of said resources; performing determining abstract or relative positions of said resources within said essentially digital device. The design is generated while optimising a cost criterion at least including resource interconnection power consumption cost, based on access activity of said resources.

In another aspect the present invention provides a method for determining an optimised resource interconnection pattern, e.g. as part of a physical design phase within an essentially digital device, the device comprising resources, said essentially digital device being represented by a representation describing the functionality of said digital device, said representation comprising transfers such as data transfers, the transfers being defined by their source resource and their destination resource, said method comprising: inputting a representation of the functionality of said essentially digital device, including the number and type of said resources and at least partial scheduling of said transfers; performing determining abstract or relative positions of said resources within said essentially digital device based on access activity of said resources while optimising a cost criterion at least including resource interconnection power consumption cost.

Yet another aspect of the present invention provides a method for determining an optimised resource interconnection pattern, e.g. as part of a physical design phase within an essentially digital device, the device comprising resources, said essentially digital device being represented by a representation describing the functionality of said digital device, said representation comprising transfers such as data transfers, the transfers being defined by their source resource and their destination resource, said interconnection pattern including at least one bus temporarily facilitating at least two transfers with partially overlapping scheduling intervals, said bus comprising a switch, defining segments within said bus, said method comprising: inputting a representation of the functionality of said essentially digital device, including the number and type of said resources and at least partial scheduling of said transfers; performing a first determination of the minimal number of parallel communicating resources and adding virtual switches to essentially all bus segments; performing a second determination of abstract or relative positions of said resources within said essentially digital device; and at least fixing the amount of switches and the place of said switches, by selectively removing virtual switches.

The representation may be a Register-Transfer Level description. Alternatively the representation may be an Extended Conflict Graph description. A first determination may be resource ordering, based on the access activity of said resources. This resource ordering may also include performing determining control aspects of said switches. The second determination may include determining an estimated resource interconnection pattern and wherein said determination of control aspects of said switches may be based on wire lengths based on said estimated resource interconnection pattern. The method may include performing (after the second determination step) buffer allocation and sizing of said buffers. After said buffer allocation a place and route step may be performed. The second determination may comprise grouping resources in at least two clusters, based on the access activity of said resources. The block ordering may be adapted for enabling groupings with low access activity between said groupings. The determining abstract or relative positions of resources may be performed on at least two hierarchical levels. The determining abstract or relative positions may be based on the access activity of said resources and (estimated) wire lengths. The removing virtual switches may be based on comparing the resource interconnect pattern power consumption gain (due to said switches) with the power consumption overhead introduced by said switches.

Another aspect of the present invention also includes a computer based system for determining an optimised resource interconnection pattern within an essentially semi-conductor digital device, said essentially semiconductor digital device comprising resources and being represented by a representation describing the functionality of said digital device, said representation comprising transfers, said transfers being defined by their source resource and their destination resource, said interconnection pattern includes at least one bus temporarily facilitating at least two transfers with partially overlapping scheduling intervals, said bus comprising a switch, said switch defining segments within said bus, said system comprising: means for receiving a representation of the functionality of said essentially digital device, including the number and type of said resources and at least partial scheduling of said transfers; means for performing a first determination of the minimal number of parallel communicating resources and adding virtual switches to essentially all bus segments; means for performing a second determination of abstract or relative positions of said resources within said essentially digital device; and at least fixing the amount of switches and the place of said switches, by selectively removing virtual switches.

Another aspect of the present invention also includes a computer based system for determining an optimised resource interconnection pattern within an essentially digital device, comprising of resources, said essentially digital device being represented by a representation describing the functionality of said digital device, said representation comprising transfers, defined by their source resource and their destination resource, said system comprising: means for receiving a representation of the functionality of said essentially digital device, including the number and type of said resources and at least partial scheduling of said transfers; and means for performing determining abstract or relative positions of said resources within said essentially digital device based on access activity of said resources while optimising a cost criterion at least including resource interconnection power consumption cost.

Another aspect of the present invention also includes a system for determining an optimised resource interconnection pattern within an essentially digital semiconductor device, comprising of resources, said essentially digital device being represented by a representation describing the functionality of said digital device, said representation comprising transfers, defined by their source resource and their destination resource, said system comprising: means for receiving a representation of the functionality of said essentially digital device, including the number and type of said resources and at least partial scheduling of said transfers; means for performing resource ordering to thereby generate topological relationships between the resources, based on the access activity of said resources; means for performing determining abstract or relative positions of said resources within said essentially digital device.

Another aspect of the present invention in a separate and individual aspect of the present invention provides a method for determining an optimized data transfer and storage organization of an essentially digital device, said essentially digital device being represented by a representation describing the functionality of said digital device, said representation comprising data transfers, said method comprising: determining a plurality of data storage organizations, each characterized by an energy consumption for data storage, said data storage organization each being capable of handling the required data storage within a given predetermined time budget; determining for each of said data storage organizations a suitable data transfer interconnection pattern; determining for each of the determined data transfer interconnection patterns a minimal data transfer energy consumption implementation; and determining said optimized data transfer and storage organization by selecting the data storage organization and corresponding data transfer organization implementation having the lowest combined data storage energy consumption and data transfer energy consumption.

Another aspect of the present invention also includes a computer based system for determining an optimized data transfer and storage organization of an essentially digital device, said essentially digital device being represented by a representation describing the functionality of said digital device, said representation comprising data transfers, said system comprising: means for determining a plurality of data storage organizations, each characterized by an energy consumption for data storage, said data storage organization each being capable of handling the required data storage within a given predetermined time budget; means for determining for each of said data storage organizations a suitable data transfer interconnection pattern; means for determining for each of the determined data transfer interconnection patterns a minimal data transfer energy consumption implementation; and means for determining said optimized data transfer and storage organization by selecting the data storage organization and corresponding data transfer organization implementation having the lowest combined data storage energy consumption and data transfer energy consumption.

Another aspect of the present invention also includes software products for providing any of the above systems when the software product is executed on a computer system. The software product may be stored and transported on a suitable machine readable storage device such as diskettes, an optical disk, magnetic tape or similar. The machine readable storage device storing the software product executes software code on a computer system which executes any of the methods of the present invention.

Yet another aspect of the present invention also includes devices made in accordance with any of the disclosed methods.

DETAILED DESCRIPTION OF VARIOUS INVENTIVE EMBODIMENTS

Figure 1:
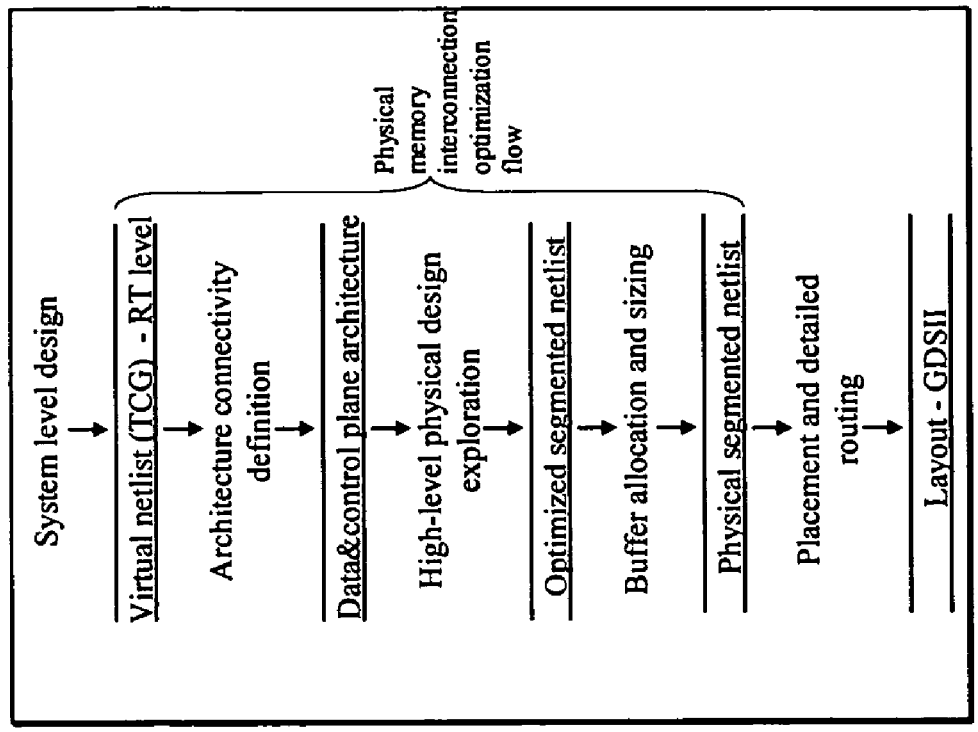
FIG. 1 shows the overall resource interconnection determination method from system mapping to post-physical design in accordance with an embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Design Flow Overview

FIG. 1 shows a design flow in accordance with an embodiment of the present invention which starts from an RTL (register transfer level) description of the architecture of a semiconductor device and results in the GDSII description of the design including the optimization of the physical interconnection. The design flow is executed in a design environment typically comprising one or more computers such as a stand alone personal computer or workstation or a series of computers connected in a local area network. Each computer may be a general purpose computer comprising one or more microprocessors, associated memory of the volatile and non-volatile type as well as a means for mass storage such as a hard disk and/or optical disks. Typically the computer will include an input device for inputting data relevant to an essentially digital device. This input device may include a keyboard and/or connection to a network such as a LAN or the Internet for receipt of the relevant data, e.g. a representation of an essential digital device. Typically there will also be output devices such as a graphical display unit and/or printers. The microprocessor typically operates as a central processing unit and an operating system running on the microprocessor provides services for software applications running on the computer. The software application execute methods in accordance with the present invention.

The flow of FIG. 1 includes three major well decoupled steps and two intermediate representations/outputs as interfaces between these steps.

The first step is the architecture connectivity definition. The input to this step is the RTL description of the architecture and the output is a netlist which includes the connectivities between all the blocks in the design and the order according to which the blocks will be connected to each other including an initial allocation of switches. The blocks are memories or other functional units of a semiconductor device. Note that this is not the final netlist that will be implemented, but rather the definition of the high-level parameters of such a netlist without the detailed description of all the blocks. For example, switches may be removed from this netlist in subsequent steps and in a later phase buffers can be added, but the high-level decisions, i.e. the number of parallel communication resources, taken in this step will not be modified.

The second step is a high-level exploration of the physical design issues. The input of this step is the output of the previous step and the output is the optimised segmented netlist. This is a representation which consists of the netlist including the final switch decisions (how many switches, where to place them) together with floorplanning information. This information is represented as a data structure containing the position of all the blocks relative to each other. The final positions on the layout are not decided yet, but decisions such as block A should be placed between Block B and block C can be made. Still, in a later phase buffers will be added to the communication network therefore the final placement of the blocks on the layout cannot be fully decided yet.

The third step of the flow is the buffer allocation and sizing. This step will insert the necessary buffers for the long interconnect wires. Decisions such as where to insert a buffer (and where not to) as well as the size and configuration of these buffers (configurable or not) will be made in this step. Its output is the physical segmented netlist. This is the sign-off point of the design method.

In a later stage this netlist can be used by industrial or academic physical design tools to produce the final layout in a GDSII format for example.

Ordering of Steps and Interactions Between Them

The ordering of the steps described above is preferably decided such that the ones that have the largest impact on the optimisation criteria (communication network energy consumption and delay, area) are performed first. For example, the architecture connectivity definition step can have a much bigger impact on the energy consumption of the communication network. If a bad decision is taken in this step the impact on the result will be large and cannot be recovered later. This is an important factor in order to avoid unnecessary global design loop iterations.

Furthermore, the splitting of the flow into these three steps and the introduction of the intermediate representations is a direct consequence of the decoupling that exists between the steps. Each of the steps can be decomposed into several sub-steps, which will be discussed further. Inside each of them the interaction between the sub-steps is significant. Between steps, however, the interaction is minimal. They are not independent, as dependencies may exist between the steps. These are taken care of by constraint propagation, for example each step may introduce one or a few constraints for the next steps. These constraints should not, preferably, limit significantly the search space of the following steps. For example, the architecture connectivity definition step will propagate some constraints to the buffer allocation and sizing step. These constraints will be the wire segments for which buffers are required. The last step still has all the freedom it needs to perform good buffering. The opposite is not possible, if the buffering is fixed the constraints for the segment lengths would be too restrictive for the architecture definition step.

One important property that should also be satisfied is the "implied ordering". This means that any step that requires output from another step cannot precede it in the design flow. Hence, the required information for each step is either produced by one of the previous steps or can be made available as input to the flow. An example of this is that the high-level physical design step cannot begin before the netlist is produced by the architecture definition step.

An important feature of this flow is that it does not require global design iterations, or in other words the design converges within one iteration. The steps are executed sequentially and no back-tracking or iteration is required among the three main steps. This can be achieved, because each step does not take any global decisions until all the necessary information is available. This is ensured by letting the steps impose constraints on the final result and propagate these constraints to the next steps. Thus a decision is taken only when all the required information is available, while still considering all the constraints that are imposed by the previous steps.

Interaction with System Level Design

The input to this design flow is assumed to be the system-level mapping of the application on an architecture. This is provided in the form of a Register Transfer Level (RTL) description of an essentially digital device. All the detailed transaction level information is encapsulated in this description, which includes the number and types of all the blocks, i.e. memories and other functional units including microprocessors or digital logic devices such as programmable gate arrays, e.g. FPGA, that comprise the architecture as well as a least a partial or a detailed schedule information for all the communication between the fore-mentioned blocks. The memories and the other functional units comprise resources of the essentially digital device. Hence, the essentially digital device is represented by a representation describing the functionality of the digital device, the representation comprising transfers that are defined by a source resource and a destination resource, and scheduling intervals for the transfers.

In an essentially digital device, several resources, such as data paths, being electric circuits computing output signals based on input signals, and memories, being electric circuits used for storing signals, are recognized. Such resources may be connected if communication between the resources is needed, for example, communication in the form of transmitting signals from one resource to another, such signal transmitting aimed at transferring information from one resource to another. The minimum unit of data transfer is usually one bit of data. Such communication may be needed for the execution of the functionality of the digital device. The connection of such resources are denoted as buses, each being a bundle of at least one interconnection line, the amount of the bundle typically defined by the bit width of the information being transferred over the bus.

A loose memory or functional unit access schedule can be provided in the form of an Extended (or Transfer) Conflict Graph (ECG) where the memory and functional unit organization is also decided upfront. The ECG is an abstract graph representation of the memory and functional units access schedule constraints. The nodes of the graph represent transfers to or from memories or other functional blocks and (binary- self- and hyper-) edges are conflicts between these transfers. An at least partial scheduling of transfers contains accesses to and from memories or other functional units. In fact, different partial schedules may satisfy the same ECG. Application arrays are the graph nodes and edges representing conflicts between these nodes. A conflict occurs when two accesses are happening to two arrays simultaneously. An ECG includes only conflict information, therefore several valid detailed memory or functional unit access schedules can be found which obey the same ECG. The ECG including the memory and functional unit organization architecture information representation is close enough to a true RTL description and can provide additional flexibility since all the constraints are included, but some freedom still exists since the access schedule information is not finalised yet.

Architecture Connectivity Definition

Figure 2:
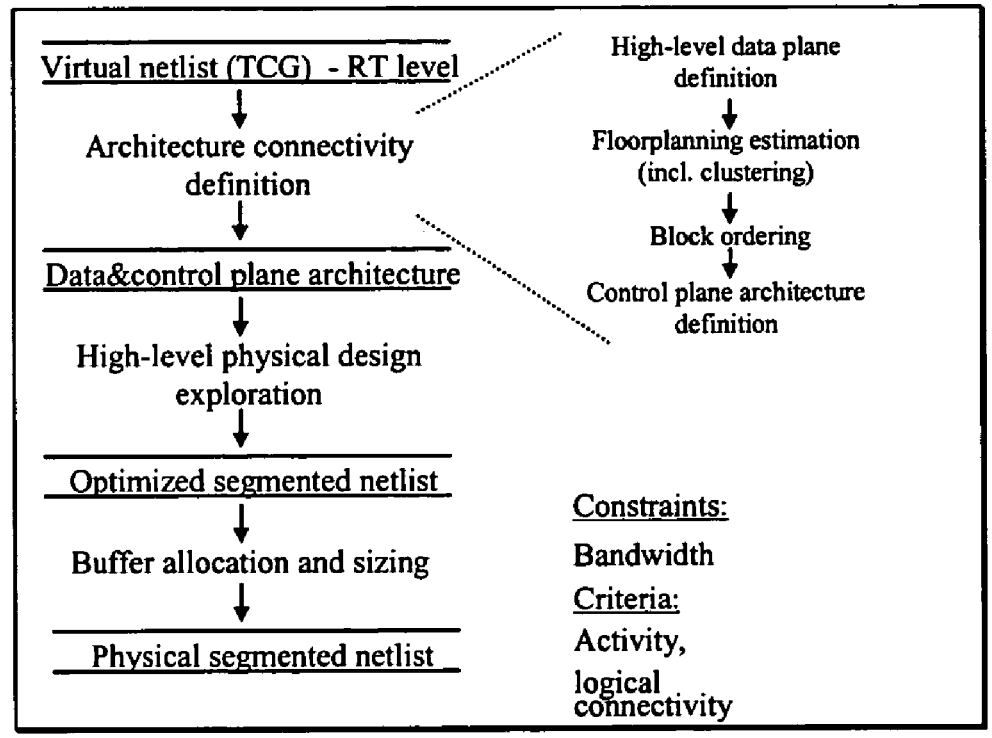
FIG. 2 shows further details of the so-called architecture connectivity definition (step 1) into sub-steps in accordance with an embodiment of the present invention.

The tasks that are performed in this step are the initial high-level definition of the data plane architecture, i.e. the allocation of the required communication resources, an estimation of the floorplan of the final design, the block ordering step and the definition of the control plane architecture, as shown in FIG. 2.

The main constraint that should be met at this stage is the bandwidth requirement of the application which is present in the memory access schedule and the memory organization. The criteria used for the optimizations introduced in this step are the activation frequencies or access frequencies of the various blocks and the logical connectivity between them. Two blocks are assumed to be logically connected when they exchange information.

High-level Data Plane Definition

As part of the input to this design flow, apart from the memory organisation, the bandwidth needed for the data transfers should also be provided, or extracted from the scheduling information that has been provided. In this step, the number of parallel communication resources is estimated (namely the minimum number of shared busses) that is required to satisfy this bandwidth by defining the connectivity of memory and functional unit ports to the busses. The methodology is based on the one proposed in [T. van Meeuwen, A. Vandecappelle, A. van Zelst, F. Catthoor, D. Verkest, "System-level Interconnect Architecture Exploration for Custom Memory Organisations" Proc. 14th Int. Signal Processing Conf., ISSS-01, Montreal, Canada Publ., Montreal, pp.13–18, September 2001.] and U.S. patent application Ser. No. 10,128,629, herewith fully incorporated by reference, deriving the memory transfer conflict information directly at the system-level by considering conflicts between arrays and the actual memory allocation and assignment decisions. The advantage is that no detailed memory transfer scheduling information is required at this abstraction level.

While the methodology proposed in [T. van Meeuwen, A. Vandecappelle, A. van Zelst, F. Catthoor, D. Verkest, "System-level Interconnect Architecture Exploration for Custom Memory Organisations" Proc. 14th Int. Signal Processing Conf., ISSS-01, Montreal, Canada Publ., Montreal, pp.13–18, September 2001.] was developed having in mind a multiple shared bus architecture, adaptations are proposed here since the target communication network architecture includes multiple segmented busses. To accommodate for this change it will be assumed at this stage that a segmentation switch is inserted in (essentially) all the connections between blocks; i.e. memories or other functional units, to any of the busses. The purpose of this default segmentation criteria is to make sure that the signals on the bus are only propagated to the relevant segments. In a further step this decision will be refined, by removing some of the segmentation switches that add overhead to the implementation without providing sufficient gains.

Floorplanning and Clustering Estimation

In order to build a netlist from the information obtained from the previous step the ordering of the blocks should also be decided. Due to any requirement for segmentation switches, the ordering of the blocks is very important because it determines which segments are activated per transfer. This ordering, however, will impose significant constraints on the floorplanning phase since the same ordering will have to be preserved on the actual floorplan.

Furthermore, the floorplanning phase is very important because it determines to a large extent the final area that the design will occupy and the final length of the wires. For this reason decisions on an ordering should be made that will match as well as possible a good floorplanning decision, while obeying all the other constraints as well. As a result, an estimation of the clustering and floorplanning sub-steps should be performed before the block ordering is performed. More details about these steps follow, the same approach can be used for the estimation. The only difference is that the estimation will have to be less accurate and far faster than the actual steps.

Block Ordering

The blocks are the resources so Bblock ordering is resource ordering for the essentially digital device. Resource ordering in accordance with the present invention is based on access activity of the resources. To determine the access activity, at least a partial transfer schedule for the resources is used to estimate the frequency of access for each resource. Resource ordering includes determining topological relationships between the resources. The relative positions of blocks may be described as a definition of topological relationships. The use of the word "topological" indicates that the exact topography is not yet known but information as to the spatial logical arrangement is available.

Figure 3:
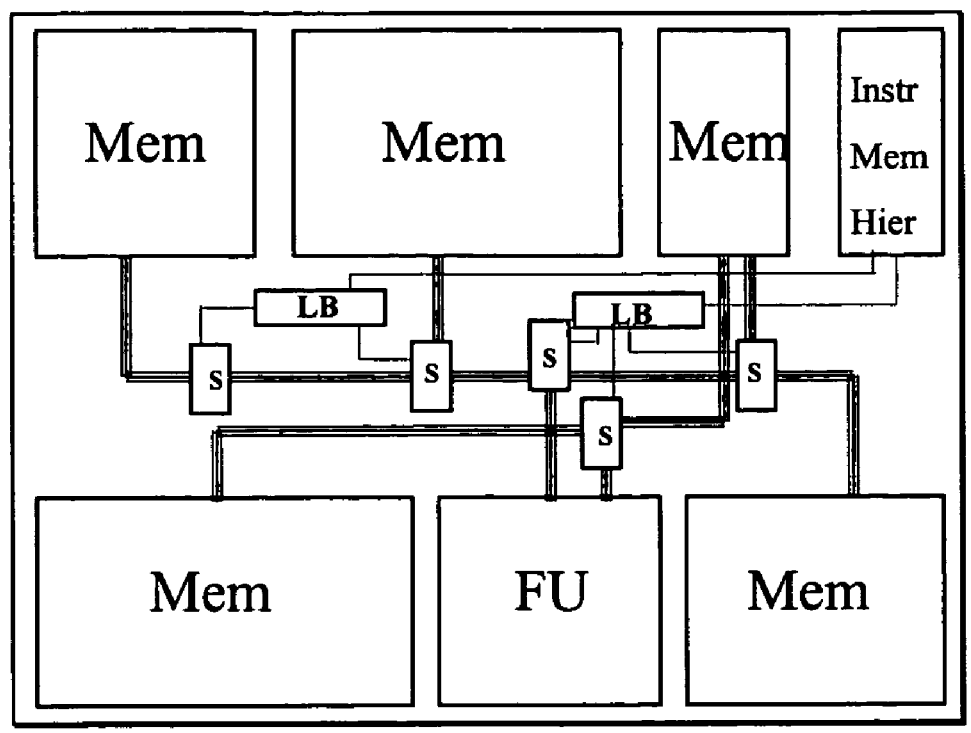
FIG. 3 illustrates the use of hierarchical control of the switches (S) of the segmented busses from the instruction memory hierarchy via local buffers (LB) in accordance with an embodiment of the present invention.

A particular problem with resource ordering can occur with segmented busses. The arbitration on the segmented busses is done by the software (compiler-driven) and is quite different from the traditional hardware arbitration in standard shared busses. It is handled entirely by the software since the conflict information is available from the memory and functional unit access schedule for the mapped application. From the design-time analysis and exploration all the information about the arbitration can be obtained. This information is then expressed in configuration bits stored in the instruction memory hierarchy, which control the access to the shared busses at run-time (see FIG. 3). This minimizes the energy overhead due to the control of the switches, if a good hierarchy of local buffers is found.

One of the main issues that has to be tackled in order to use segmented bus communication network architecture is the configuration of the switches. In the very worst case all the switches have to be configured before every transfer on the bus. This would incur an energy and delay overhead. The energy overhead comes from the switching of all the control wires required to steer the switches and, to a lesser extent, to the energy that is consumed by the switching of the logic. The delay overhead would be the result of the time needed to configure the switches, in the worst case one clock cycle would be require for the configuration an one for the data transfer over the bus. The energy overhead is not very important and can be tackled in various ways, i.e. local buffer hierarchy, the delay overhead however can become unacceptable.

A solution to the delay overhead is to keep the same configuration in the switches for some time. Typically the application domain hat is targeted contains applications whose source code is full of nested loop structures. Very often inside the body of the inner loops of the application, a few arrays, stored in one or few memories, are accessed. Given that these kinds of loops involve large numbers of iteration it would be possible to keep the switch configuration constant for the duration of each of the inner loops. This way the reconfiguration of the switches happens only once in every few tens or hundreds of cycles, which can be an acceptable overhead in time. In order to keep the energy consumption under control, though, constraints have to be propagated from this step to the block ordering. An example of this interaction can be seen in FIG. 4.

Figure 4:
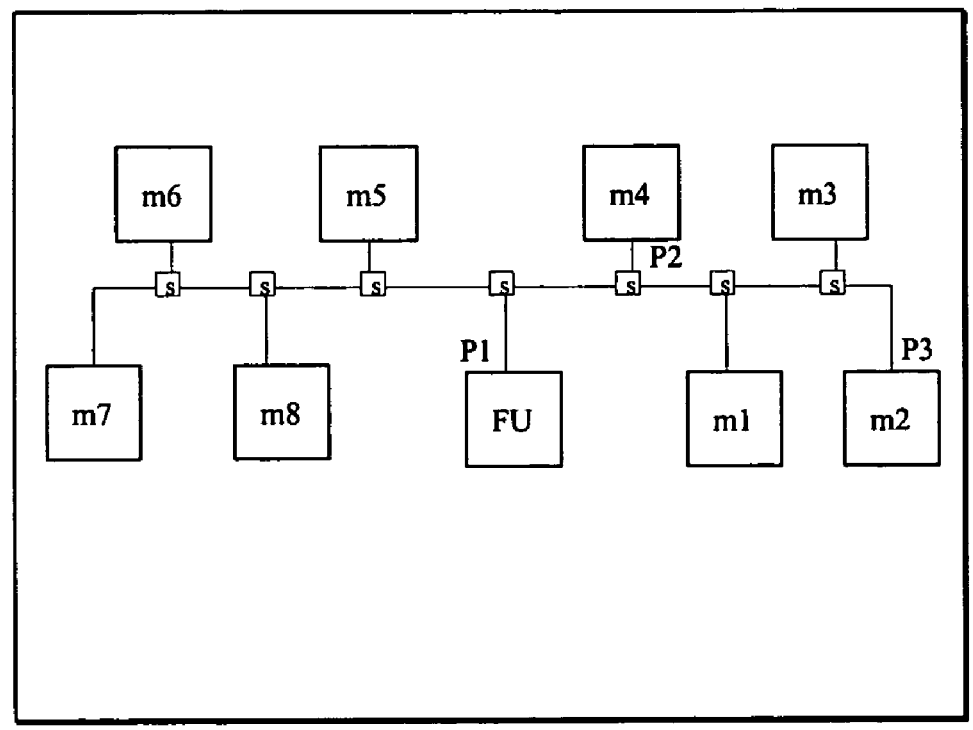
FIG. 4 is a schematic figure to illustrate the interaction between the control plane architecture and block ordering steps in accordance with an embodiment of the present invention.

By way of example, let's assume that memories 2 and 4 are accessed by the functional unit in the same inner loop body. It is thus reasonable to fix the switch configuration and not change it for purposes of delay overhead minimisation. It can further be assumed that memory 2 is heavily accessed and memory 4 is seldom accessed. For example the functional unit may want to read 5 data elements from memory 4, perform an operation on them and store the result in memory 2. As a result the activity of memory 2 will be five times smaller than the activity of memory 4, that is neglecting any other accesses that may happen to these memories. For this example it looks like the block ordering that is shown in FIG. 4 is not good. For every access to memory 4, which would normally require that activity is only propagated from P1 to P2, the bus activity has to be propagated from P1 to P3. This will deteriorate the energy gains from bus segmentation. One way to solve this problem is to "place" memory 2 to the left of the functional unit. This way the connections from these two memories would become again only as long as absolutely necessary. Another potential solution is to "place" the two memories close to each other so that the impact of keeping the switch configuration would be minimal on energy consumption. It is clear, though, that the control plane architecture decision step has to impose some constraints on the block ordering step that follows. One form of such constraints would be to annotate memories as mutually incompatible. This means that the paths, i.e. collection of segments connecting the memory to the functional units, of these two memories should not share a single physical segment. This would suffice in order to apply the first of the two solutions proposed above. To apply the second solution, a change in the annotation of the activity of each memory is required. It would be enough if for each memory, not the activity of the memory itself is considered but a weighted sum of the memory activity and the activity of its path when performing the block ordering. The information required to apply this step is limited to the access schedule of the transfers at the RT level. The activity of each block and the time intervals where several blocks are simultaneously communicating (which blocks are accessed in a given loop body) can be extracted from the access schedule.

Figure 5:
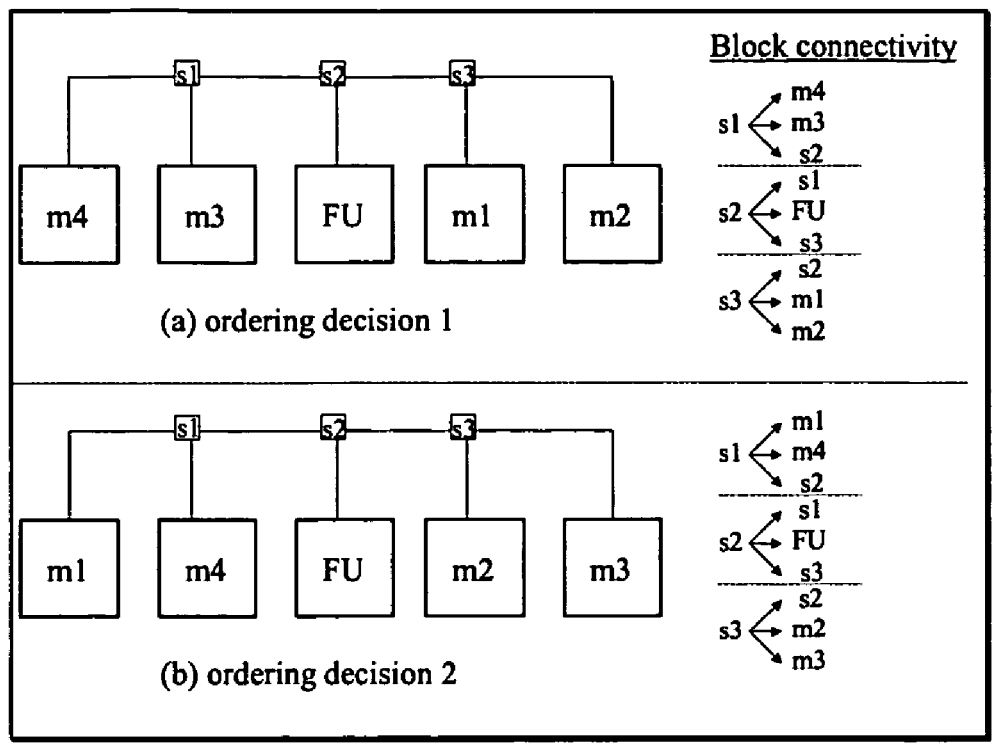
FIG. 5 shows two different block ordering options: switch s2 has the same netlist connections, but switches s1 and s3 have different netlist connections in accordance with an embodiment of the present invention.

This sub-step is the one that will decide the final order of the connections of the blocks in the netlist. This step is necessary due to the use of segmented buses as the communication network architecture. If multiple shared buses were used instead, the order of the connections would not matter. But since, the use of segmented busses enables the restriction of the activity propagation this sub-step is required to make sure that globally a good solution is found. FIG. 5 shows the concept of block ordering. The main optimization target in this stage is communication network energy consumption. An abstract metric can be defined for this energy consumption that can be based on how many segments have to be activated for each access and the activity of each of the segments. The length of the segments is not yet defined, but the number of segments is a sufficient indication at this stage of the flow.

It is clear that many options exist for the ordering of the block connections in the netlist, and only two are shown in FIG. 5. The blocks named "mX" are the memories of the design and the blocks denoted as "sX" are the segmentation switches. The decision that should be taken in this step is the final order of the blocks. This decision can be taken at this step and does not have to be revised, because it is purely based on the activation frequency information of the various blocks and potentially information about the "incompatibilities" between memories discussed in the previous section.

The ordering can follow the activity-aware template that was proposed in [H. Wang, A. Papanikolaou, M. Miranda, F. Catthoor, "A global bus power optimization methodology for physical design of memory dominated systems by coupling bus segmentation and activity driven block placement", *Proc. IEEE Asia and South Pacific Design Autom. Conf.* (ASPDAC), Yokohama, Japan, pp.759–761, January 2004]. Memories that communicate a lot with a given functional unit should be placed close to that unit. This template is relatively easy to apply in a simple example like the one discussed here. If, however, the design consists of several functional units and several memories, each of which communicates with more than one functional units, analysis become quite complicated. An ordering should be found which is optimal for the entire design and not just for a part of it.

Data and Control Plane Architecture Definition

Once the block ordering has been decided all the information is available to decide on the hierarchy of the local buffers. As discussed in the previous section a good hierarchy of these local buffers can minimize the energy overhead that the segmented busses introduce, see FIG. 3. Given that the configuration bits are known, the block ordering is fixed and a wire-length estimation exists from the floorplanning estimation, this hierarchy can be decided. This step is based on the work proposed in [M. Jayapala, F. Barat, P. Op de Beeck, F. Catthoor, G. Deconinck, H. Corporaal, "A Low Energy Clustered Instruction Memory Hierarchy for Long Instruction Word Processors", Proc. IEEE Wsh. on Power and Timing Modeling, Optimization and Simulation (PATMOS), Springer Verlag, Lecture Notes in Comp. Sc. Series, Sevilla, Spain, pp. 258–267, September 2002.]

The idea behind this method is that switches that are physically close in the floorplan can be controlled by a single local buffer, or a hierarchy of local buffers. Thus, the activity of the control wires will be reduced and perhaps even the configuration information can be encoded to further reduce it.

High-level Physical Design Optimization

Figure 6:
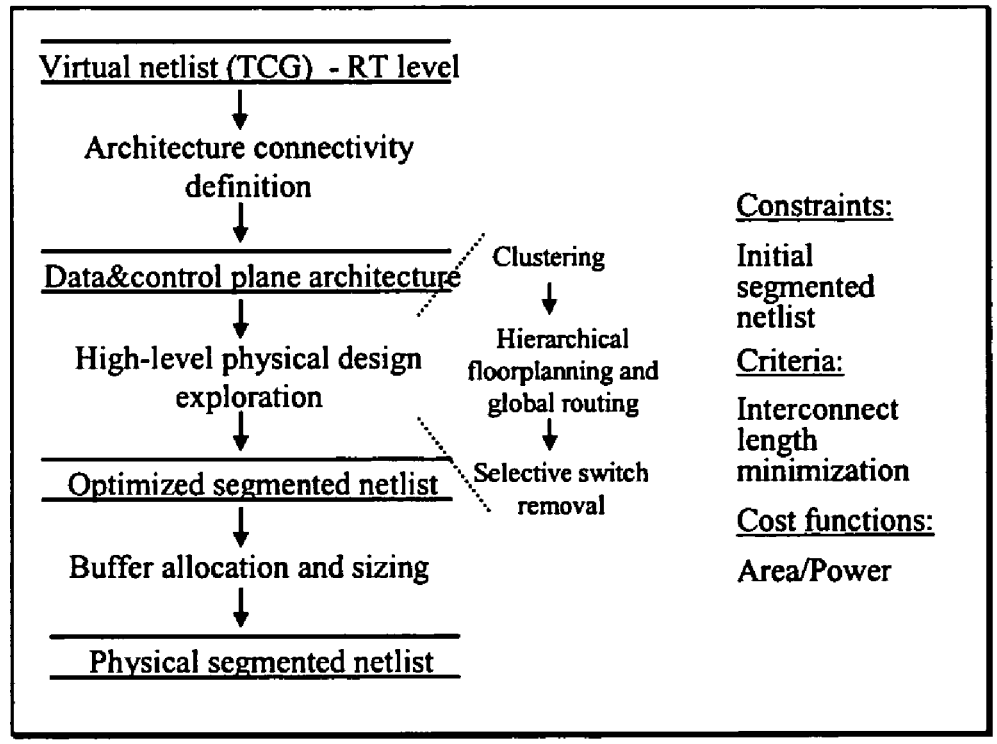
FIG. 6 shows further details on the so-called high-level physical design using estimators (step 2) into sub-steps in accordance with an embodiment of the present invention.
Figure 7:
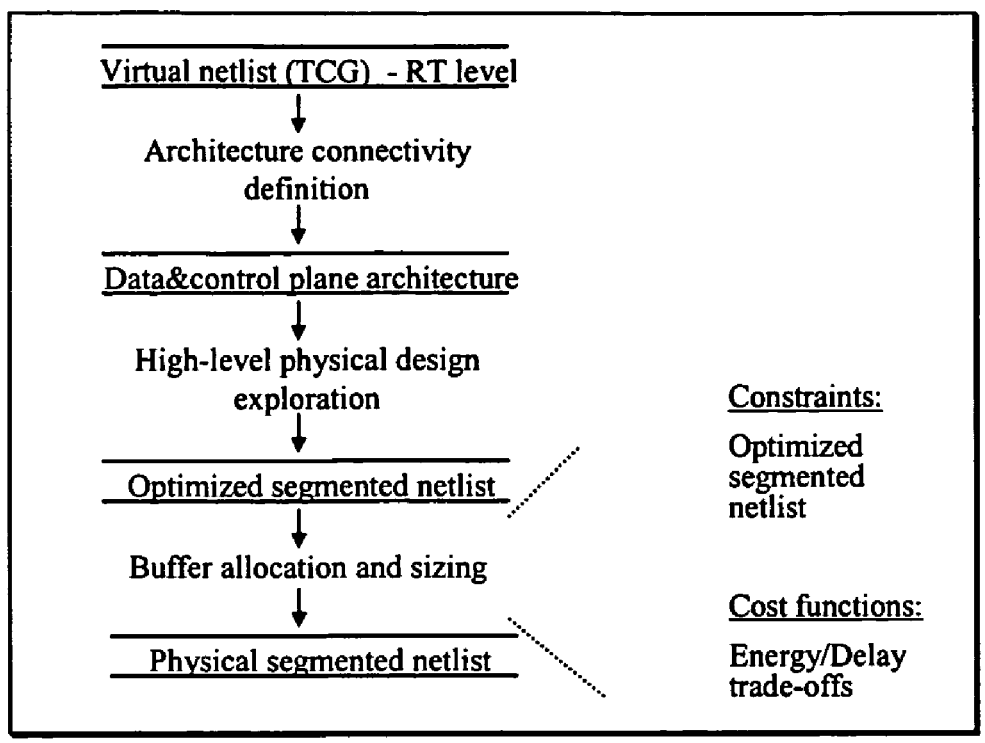
FIG. 7 shows further detail on the so-called buffer allocation and sizing step (step 3) in accordance with an embodiment of the present invention.

The tasks performed in this step are the partitioning of the netlist into cluster, the hierarchical floorplanning and global routing and finally, the selective switch removal sub-step, see FIG. 6.

The constraints are propagated to this step via the initial segmented netlist, which includes all the data and control plane architecture informationa as well as the block ordering. The optimization criterion is the interconnect length minimization and the cost functions to be used include the energy consumption of the interconnect and the area of the layout.

Clustering or Netlist Partitioning

This step involves partitioning the physical netlist into clusters to enable the hierarchical floorplanning step. The number of clusters and the number of hierarchy levels the netlist is partitioned into introduces a very tight coupling between this step and the hierarchical floorplanning step that follows. The task of this step is to find an appropriate partitioning of the netlist which optimizes a specific cost function. Metrics that should be considered in this function are the activation frequency of the segments where the "cut" will take place and the area of the resulting clusters. The segments that will be running between clusters should have an as small as possible activity, because their length will be significantly larger than the segments that are confined inside one cluster. Other criteria that should be kept in mind are the number of blocks per cluster and the area of the clusters. The number of blocks per cluster should be more or less balanced, because this will enable a faster floorplanning. The area of the clusters also has to be taken into account because it is much easier to floorplan later clusters that have more or less the same size, rather than floorplanning clusters with extremely different sizes. Having clusters of equivalent sizes will enable a more regular floorplanning. These, however, are secondary concerns. They should be considered but not as primary concerns.

The interaction with the previous sub-step (block ordering) is weak. If good decisions are made in the ordering step then most of the activity should be centralised in several "hot-spots" in the netlist and the activity between these spots should be significantly less. This is clearly a beneficial property for this step, since it is easier to partition the netlist such that these "hot-spots" become individual clusters.

The implementation of this can be done using a standard algorithm, i.e. an extention of the Kernighan-Lin algorithm [S. M. Sait, H. Youssef, "VLSI physical design automation" McGraw-Hill, 1995, pp.49] for graph partitioning which includes weights. In an embodiment thereof the segment activity information and the cluster size information is expressed in a sinlge cost function compatible with the given algorithm.

Hierarchical Floorplanning and Global Routing

The purpose of this step is to provide the abstract or relative positioning of the blocks in the two-dimensional layout of the essentially digital device. At least a rough idea of the routing resources required to connect the blocks is decided. The exact placement of the blocks will not be decided yet, but the positioning of each block relative to each other will be finalized.

This problem is actually a rectangle packing problem steered by a cost function. This cost function should at least take into account the energy consumption expressed as the wire-lengths of the segments (which will be provided by the global routing) weighted by the activity of the segments; and the total area of the design.

Existing flat floorplanning algorithms can probably be utilised for the intra-cluster floorplanning at each different hierarchy level, assuming that there is a way to introduce to the tools the constraints that should be propagated from the previous steps. By executing such an algorithm inside the and between the clusters the final floorplan is produced in a two-level partitioning hierarchy. However, the steering cost functions and heuristics that drive this algorithm is revised to cope with the additional segment activity information. Furthermore, one of the reason to go to a hierarchical floorplan approach is to speed up the whole procedure, but also to enable efficient hard-IP re-use at the physical design phase. A small overhead in area is expected, but significant speed-up and re-use benefits should be achieved compared to a pure flat floorplanning technique.

Selective Switch Removal

Once the information about the length of the segments is estimated, a good estimation of the energy consumption of the communication network can be made, including the overhead that the steering of the switches introduces. So far, switches have been potentially inserted at every connection of blocks to the busses. In this sub-step a decision can be made to remove some switches if the energy gains they provide is small compared to the associated overhead. For example, if the netlist contains a switch which decouples two very short segments, then this could be a candidate for removal. The reason is that by removing the switch the product of activity times wire-length (proportional to energy) will be slightly increased, but the control overhead for the switch will be removed. If the overhead for the control including the necessary wires is larger than the energy gains provided, it makes sense to remove that switch from the netlist.

Buffer Allocation and Sizing

The purpose of this step is to add the (run-time Pareto) buffers that are required to drive the long interconnect wires. It is not further split into sub-steps. Once the floorplan and the global routing has been finalized, information about the wire-length of the segments is estimated. These lengths might still change a little during the detailed placement and routing sub-step, but global routing can provide very accurate estimates already. Based on this information, the decisions on where to allocate buffers on the communication network and what kind of buffers to allocate should be made.

The constraints that are propagated to this step from the previous steps are expressed in the optimised physical segmented netlist. The cost function that will steer it is a energy vs. delay trade-off exploration based on the application timing constraints.

After the addition of the buffers on the busses the netlist is finalized and floorplanning information is also available. This will be considered as our sign-off point.

The output of this step will be later transformed into a layout representation, i.e. GDSII using existing commercial or academic tools. Steering functions might have to be developed for the tools, but this is not a major research effort.

Further description on buffer sizing and allocation is found in provisional application entitled "Power-Aware Configurable Bus Driving circuits", filed on Jun. 18, 2004.

In a further independent and standalone aspect of the invention a combined exploration of the memory organisation with the one of the communication network is proposed, in particular in the context of segmented bus architectures. This combined exploration can provide gains of 30% in the overall energy consumption of both the memory and its interconnection network and factors ranging between 3–6 for the energy of the network alone compared to more conventional bus architectures.

Note that in past technology nodes the energy consumption of the wires was mostly negligible. For the present (130 nm) and especially for the future technology nodes, however, this assumption is gradually becoming unacceptable, therefore the methodology is introduced to find the energy-optimal memory organisation including the overhead of the communication network.

The aspect of the present invention relates to intra-processor communication (within a tile). A factor that also greatly influences the energy consumption of the communication network is the floorplan of the design. A strong link exists between the exploration of the memory partitioning and the communication network architecture exploration. Such work has been carried out by Grun et. al.[P. Grun et. al., "Memory system connectivity exploration", *Proc. DATE*, France, 2002] and Benini et. al.[L. Benini et. al., "Layout-driven memory synthesis for embedded Systems-on-Chip", *IEEE TVLSI*, vol. 10, no.2, April 2002.]. In the first work the connectivity of the memories has been explored, but the architecture of the communication network has not been explored and the impact of the physical design steps, like placement and routing has been neglected. Benini et. al. have also incorporated the physical design effects in their exploration, but they are still focusing on a conventional fixed communication network architecture, namely shared busses. In both the fore-mentioned approaches the use of a single shared bus is a limiting factor in the exploration of the memory organisation. The use of a single bus constraints the available bandwidth between the memories and the processing elements. As a result, the ordering of the memory transfers has to be sequential, so two data elements cannot be fetched simultaneously. Having two busses would enable two memories to be accessed in parallel, thus increasing the bandwidth of the communication network. However, allocating two fully parallel centralized busses would introduce quite some overhead in access latency and arbitration. In the this aspect of the present invention multiple busses are used to guarantee the bandwidth requirements and provide freedom to the scheduler, but the overhead is reduced by using the segmented bus approach and a single bus arbitration scheme suitable for intra-tile communication.

An additional source of energy dissipation are the buffers required to drive the long wires which comprise the communication network. A lot of work has already been done for gate sizing in logic circuits [O. Coudert, *Gate sizing for constrained delay/power/area optimization*, IEEE Trans. on VLSI Systems, vol. 5, no. 4, Dec. 1997]. Such techniques can be reused to optimise the energy consumption of the busses.

In embodiments of the present invention all these parameters are combined in one methodology to fully explore the available search space for the implementation of the memory communication network and it is even possible to couple this exploration with the exploration of the memory organization itself.

Energy-optimal Intra-tile Memory Organizations

In this embodiment the focus is on the intra-processor memory organisation for application domain specific processors. Such memory organisations are created specifically to match the requirements of the domain. Thus, first the applications have to be analysed and their requirements from the memory organisation are extracted in the form of maximum memory bandwidth requirements. This bandwidth is directly translated into the minimum number of ports that the memory organisation should have. Taking this into account, together with the fact that distributing the memory organisation is more efficient for energy consumption, the optimal number of memories can be found.

Another important metric is the speed of the organisation. The total delay is the sum of the memory access delay plus the communication network delay. Distributed memory organisations provide advantages also in delay, because the more the data is distributed the smaller the memories have to be. Thus the latency of the organisation is decreased since smaller memories have smaller access delays. Given the timing requirements of the application, it must be guaranteed that the communication network is fast enough to meet the real-time operation for the given memory organisation.

Distributed memory organisations, however, incur an energy overhead on the communication network. Having more memories usually results in longer busses, due to the additional complexity for the floor-planning steps and the physical distribution of the additional blocks. If only one memory exists it is easier to find a placement where the ports of the memory and the processing element are very close, hence minimising the bus length and energy consumption. Distributing the memory organisation makes this optimisation more difficult.

This effect has been ignored in the past for distributed memory organisations due to the negligible energy consumption of the communication network compared to the processing elements and the memories. In the current and especially in the future technology nodes, however, this contribution gradually becomes too significant to neglect. Hence, a coupling between the two exists and must be considered when exploring the memory organisation and the communication network while aiming for total energy minimisation, as shown further.

Energy-optimal Communication Network Architectures

A number of architectural optimisations exist for the minimisation of the energy consumption of the communication network independently of the memory organisation configuration. A few of them are summarised in the following sections. Execution of an application task within given timing constraints will be considered. The communication networks are either customised or should allow for configuration of the network communication paths for a given application.

Required Communication Resources

In the above it has been discussed how based on the application level information one can determine the amount of bandwidth, in terms of number of simultaneous data transfers, that is required between the memory organisation and the data-paths. This step includes an estimate of the number of parallel communication resources (namely the minimum number of busses) required to satisfy this bandwidth by defining the connectivity of memory and functional unit ports to the busses. The approach targets an application specific architecture. The number of shared resources is obtained from the access schedule of the application and the memory organisation. Based on this information, several conflict free communication paths can be determined.

Figure 8:
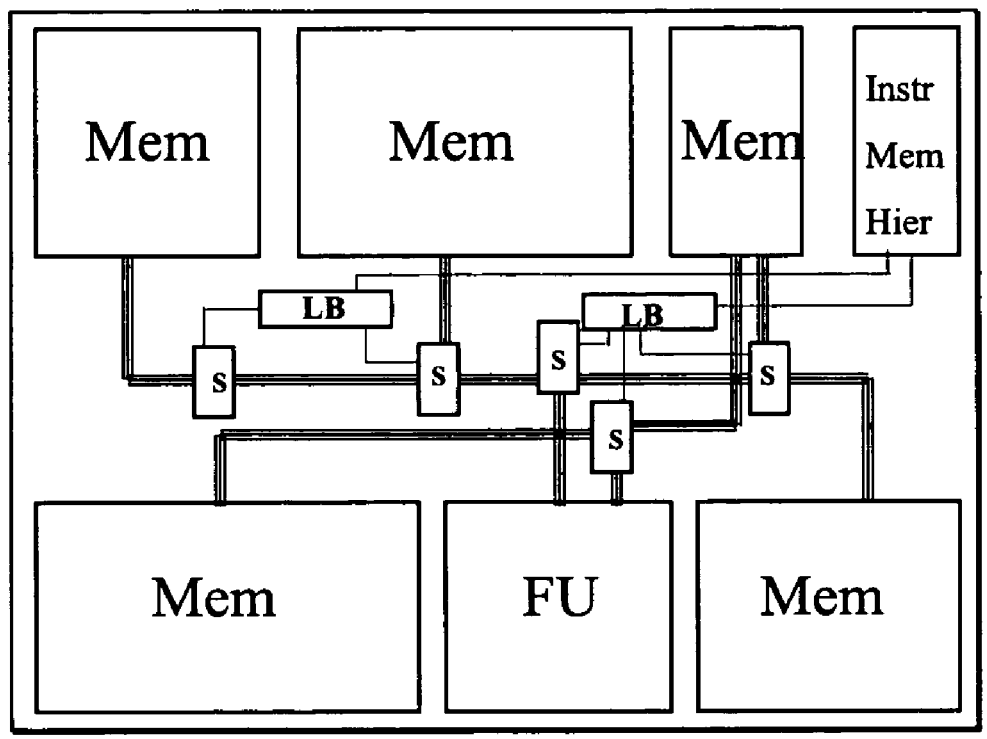
FIG. 8 shows hierarchical control of the switches(S) of the segmented busses from the instruction memory hierarchy via local buffers(LB) in accordance with an embodiment of the present invention.

The arbitration on these paths is done by the software (compiler-driven) and is quite different from the hardware arbitration in standard shared busses. It is handled entirely by the software since the conflict information is available from the memory access schedule for the mapped application. From the design-time analysis and exploration all the information about the arbitration can be obtained. This information is then expressed in configuration bits stored in local buffers, which control the access to the shared busses at run-time (see FIG. 8). This incurs a small energy overhead and no delay penalty for the control of the busses.

Bus Segmentation for Low Power

Once the number of parallel communication resources is decided, the next step is to define the interconnection structure. Different communication network architectures exist to connect the local memory hierarchy with the processing elements. The most energy-efficient architecture uses point-to-point connections, where each memory has its own dedicated bus connecting it to the processing elements. This solution however usually incurs a too large cost in implementation complexity, since a very large number of wires has to be routed. Wire congestion and temperature increase at the congested points makes the option of point-to-point connections impractical. The solution most often used nowadays is a shared bus. Its main advantage is the simple implementation. Its energy consumption, though, is unacceptable for low-power systems and it does not scale well with the increasing number of connected blocks, given the very large associated switching capacitance.

An intermediate solution is based on using segmented (multiple) busses [L. Benini et. al., "System-level power optimization techniques and tools", *ACM TODAES*, Vol.5, No.2, April 2000]. The underlying principle is to add switches on the bus so that the activity propagates only to the necessary segments, thus decreasing the capacitive load of the bus. Their energy-efficiency is much better than that of a shared bus at the cost of a limited implementation overhead. Note also that the energy consumption of the segmented busses does not change significantly for different memory organisations, regardless of how distributed they are. This indicates that segmented busses scale much better than shared busses with the increasing number of connected blocks. The reason is that more memories provide more opportunities for segmenting the busses, thus even though the busses are longer, the additional opportunities more than compensate for the overhead.

The associated overhead of segmented busses is the required control for the switches, but its impact in energy consumption is limited. The switches themselves dissipate negligible energy, the overhead comes from the routing of the single control wire that is required for each switch. However, introducing a hierarchy with (heavily) distributed clusters in the lower stages in the switch control can strongly alleviate the impact of these wires on the overall energy consumption of the communication network.

Activity-aware Floor-planning

Once the interconnection architecture is decided, the floor-planning and global routing stage also has a significant impact on the energy consumption of the communication network. During floor-planning the lengths of the busses are implicitly decided. At this stage creation of an energy aware floor-plan is needed, for which application-level information like the activation frequencies of the various blocks is required. This is a complementary step in the overall approach.

Figure 9:
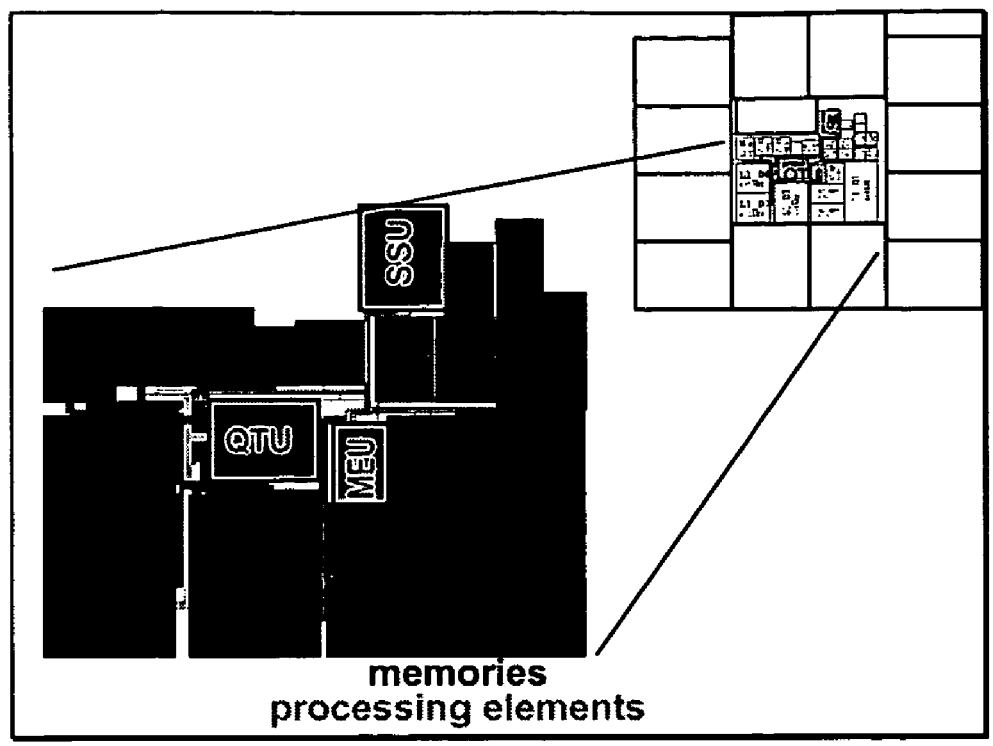
FIG. 9 shows a floor-plan of the first layer of memory hierarchy and the functional units of the QSDPCM application in accordance with an embodiment of the present invention.

FIG. 9 shows the floor-plan of the local memories and the processing elements of the QSDPCM. It is clear that different floor-plans can result in significantly different lengths for the busses. The technique used aims at ordering the blocks according to their activity so that heavily communicating blocks are placed physically close to the source of the activity (functional unit or register file). In this way, memories that have larger access frequencies are placed closer to the data-paths in the floor-plan. Thus, the connections that are very often activated get very short lengths and vice versa, resulting in the globally optimal physical network energy consumption. In the experiments performed for this work each memory organisation has been floor-planned separately following these guidelines. The information about the lengths of the busses is then extracted from the floor-plans.

Bus Buffering Exploration

For each of the bus segments resulting from the physical design step a buffer must be allocated to drive the associated load. This is a non-negligible source of energy dissipation. Well-known buffer sizing techniques exist, which determine the size of these buffers depending on the timing constraints that have to be met. The faster the bus needs to be, the larger the required buffers and vice versa. But the larger a buffer is, the more energy it consumes. Thus, a trade-off clearly exists between the energy consumption and the delay of the bus by changing the buffer sizes.

Since determination of the timing constraint for the communication network upfront is difficult, the present embodiments provides collecting several potential buffer implementations for a range of timing constraints for each wire segment for exploration purpose.

Methodology for Low Power Network Architecture Exploration

In order to find the optimal memory organisation including the communication network, all the above steps have to be combined. However, the resulting search space is very big. Therefore a combined exploration of all parameters at once is difficult or not feasible. Thus, this embodiment creates a global methodology with steps that are as decoupled as possible, with the appropriate constraint propagation from start to end. Then each issue can be adequately handled and the combination of the solution of each step is very close to the real global optimal solution if done well. To achieve this, apart from the constraint propagation, it is also important to keep all energy/delay (near) optimal solutions that are local to each step. Only solutions are discarded that are not interesting at all locally for the communication network and which thus would not be interesting globally either. But no final decisions are made locally: all the interesting solutions are collected and in the final stage the best combination of all the potential solutions is chosen. In practice this still allows a strong pruning.

The proposed methodology for finding the energy-optimal memory organisation for a given ordering of the memory accesses is as follows:

1. For each memory organisation
(a) Calculate the required parallel communication resources
(b) Perform the physical design stage using activity aware floor-planning and buffer sizing
(c) For each bus or segment obtain the potential Pareto-optimal buffer configurations.
2. For all organisations generate the resulting global Pareto curve This methodology can be applied for both shared and segmented busses.

In the final stage (2) all the potential options for the memory organisation are combined with all the interesting options for the communication network and the decision is made which solution is the globally optimal for energy consumption. This means that all the interesting options for the buffer sizing in the physical design step are crossed with all the options for the architecture of the network etc. All these points are then combined with the given memory organisation. This procedure can then be repeated for all the different memory organisation alternatives. Once this exploration is completed, the system can make the decision of which combination of local options is globally optimal.

Experimental Set-up

To test the proposed methodology and its results it has been applied on two real-life application drivers. The first application is the Quad-tree Structured Difference Pulse Code Modulation (QSDPCM). It is an inter-frame compression technique for video images. It involves a hierarchical motion estimation step and a quad-tree based encoding of the motion compensated frame-to-frame difference signal. This is a typical multi-media application.

The second application used is the Digital Audio Broadcast (DAB) receiver. The transmission system in the DAB standard is based on an Orthogonal Frequency Division Multiplex (OFDM) transportation scheme using up to 1536 carriers (Mode I) for terrestrial broadcasting. At the DAB receiver side the OFDM carrier spectrum is reconstructed by doing a forward 2048-point FFT (Mode I) on the received OFDM symbol. This application is representative of the wireless application domain.

Next the used power models are introduced. To estimate the energy consumption of memories a variation of the CACTI model developed at the University of Texas for obtaining a model representative of the current technology node is used. Furthermore, a few additions have been made to this model in order to simulate memories, not caches, and energy consumption estimation has been added. For all the estimations data corresponding to the 130 nm technology node from the ITRS roadmap is used.

Application Level Results

In this section the results are shown of the complete methodology for these two applications and discuss their impact on the methodology itself.

Figure 10:
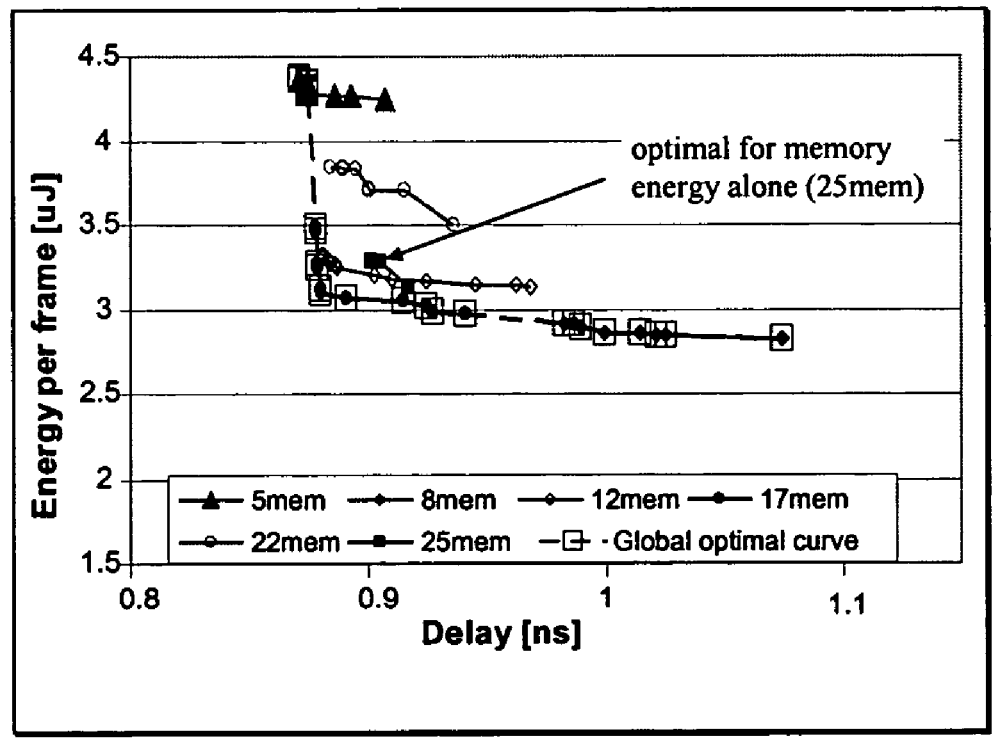
FIG. 10 shows an energy/delay globally optimal memory organisations using shared busses in accordance with an embodiment of the present invention.

FIG. 10 shows the energy vs. delay optimal memory organisations including the communication network for the QSDPCM application driver. Each curve represents a given memory organisation, a fixed number of memories and a fixed access schedule. The variation in delay for each curve comes from the different options for the buffer sizing. The curve titled "global optimal curve" collects all the globally optimal points. It does not make sense to choose a point that does not belong to this curve, because another point will always exist which is better in energy for the same delay or vice versa.

It is interesting to note that the curve for the most distributed memory organisation has no common points with the "global optimal curve". This means that, no matter the delay constraints, the memory organisation which is energy optimal when neglecting the communication network is seldom optimal when the network is taken into account. This shows that a clear coupling exists between the memory organisation and the network in the case that shared busses are chosen as the target communication architecture.

In the case of segmented busses the global optimal curve largely coincides with the energy/delay curve of the most distributed memory organisation. The only exception is the fastest point. In that case the second most distributed memory organisation becomes optimal for energy given the very tight timing constraints. Further experiments have to be done for even more distributed architectures to see if this trend is maintained.

Figure 11:
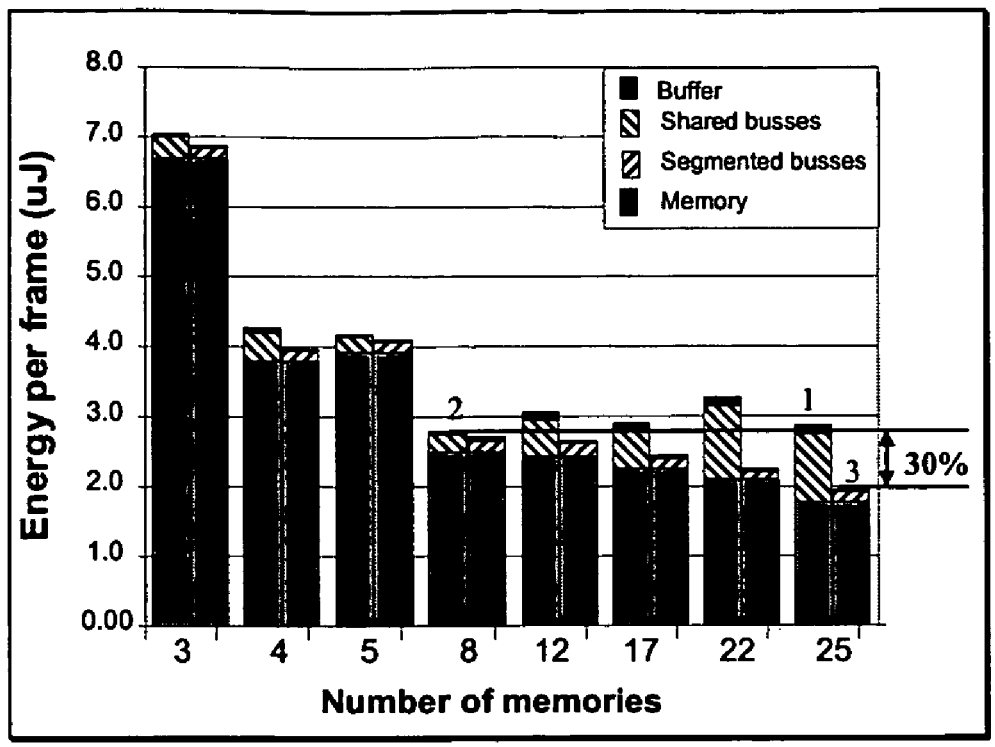
FIG. 11 shows a total energy consumption for the QSDPCM including memories and communication network for different organisations, left columns show shared busses, right columns show segmented busses in accordance with an embodiment of the present invention.

A similar conclusion could be drawn from FIG. 11 for shared busses. It shows the energy consumption of the memory organisation together with the communication network and its breakdown between the memories, the wires of the busses and the required drivers for the QSDPCM application. The assumed delay in this case is the necessary one to meet the real-time application constraints when running only this application. The horizontal axis corresponds to different memory allocations. The memory access ordering is the same for all the cases. However, the number of memories is different for each pair of columns and as a result, the subsequent floor-plans are different. Each pair of columns shows the energy consumption of a memory organisation communicating via shared busses (left) and the same memory organisation communicating via segmented busses (right). The shared bus case is considered as the reference. However, all the above optimisations have been applied also on the design based on shared busses, thus they are quite optimised compared to standard industrial designs.

The energy consumption of the shared communication network clearly increases when the number of memories increases. Furthermore, the energy consumption of these busses is significant for distributed memories and will become even worse in future technology nodes where the interconnect lines will become more dominant in energy consumption. The most important conclusion, however, is that the memory organisation that is energy-optimal when neglecting the shared busses is no longer the globally optimal for energy (as demonstrated in FIG. 10). If the consumption of the shared busses is neglected the rightmost memory allocation is the optimal, marked 1 in FIG. 11. But, the energy consumed in the network is quite large so the overall energy-optimal memory organisation is the bar marked 2. This implies that if shared busses are used the exploration of the memory organisation and that of the communication network have to be combined to ensure that the globally optimal point if found. Note also that for very distributed memory organisations (bar 1 in FIG. 11, 25 memories) the energy consumption of shared busses is almost as much as the consumption of the memory organisation. Distributed memory organisations are still much more energy-efficient than centralised ones, but the communication network dictates the limit above which further distribution creates more overhead than gain.

Comparing the energy consumption of the memory organisation with shared busses against the one with segmented busses some interesting conclusions can be drawn. The energy consumed in the segmented communication network is now lower when using a large number of memories. Hence, segmented busses are more scalable, in terms of number of connected components. This is shown in FIG. 11. If shared busses are used the optimal number of memories is eight. The use of segmented busses allows the further distribution of the memory organisation to 25 memories, thus reducing memory and total energy consumption.

The lower associated capacitance of the segmented busses due to the activation of smaller pieces of wire is directly translated into energy reduction. This lower energy consumption is the reason why the memory organisation can be further distributed compared to shared busses, the number of memories above which the overhead exceeds the energy gains is pushed toward a far more distributed organisation.

It is clear that using the methodology proposed, improvements can be made on the design flows used currently regardless of the communication network architecture. If the exploration of the communication network is neglected and shared busses are used then the resulting relative energy consumption of the network would be around 45%, as indicated in FIG. 11 (bar marked 1). This is the current state-of-the-art flow, the memory organisation is designed first and then connected using one or multiple shared busses. A first optimisation would be to take into account the energy consumed in the communication network. In that case the optimal memory organisation would be the one marked 2. Note that only by taking the busses into account a globally better solution is found. If the use of segmented busses is also considered and following the proposed methodology the memory organisation marked 3 in the Figure is obtained. The use of segmented busses has enabled the use of the energy-optimal memory organisation and the energy gain compared to the best possible organisation using shared busses is 30%.

Figure 12:
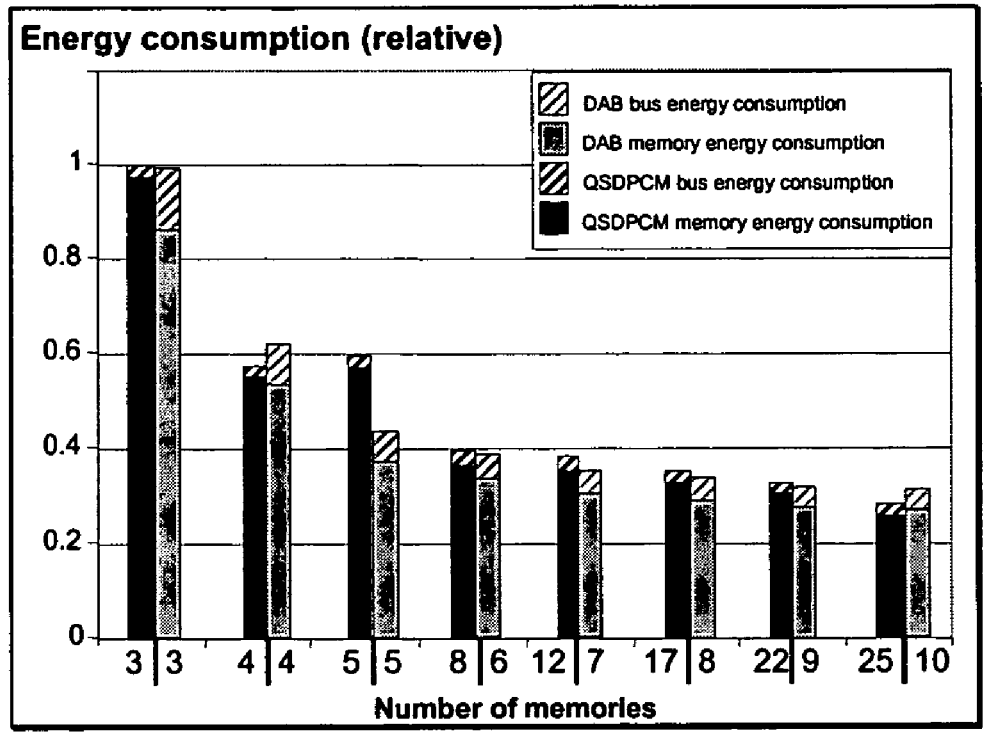
FIG. 12 shows a relative energy consumption of optimal memory organisation and segmented communication network on the DAB and the QSDPCM applications in accordance with an embodiment of the present invention.

In order to test these embodiments of the present invention they have been applied to another real-life application driver, the Digital Audio Broadcast (DAB) receiver. The results are shown in FIG. 12. The vertical axis is the normalised energy consumption and the horizontal axis is the number of memories allocated for each driver. Thus each bar for each of the two applications implies a different floor-plan. The buffer energy consumption is included in that of the busses.

The overall conclusions drawn from the QSDPCM results are also applicable for the results obtained on the DAB. For both applications the final optimised communication network energy consumption is still small compared to that of the memories. This situation, though, is expected to change as technology scales down into very deep sub-micron nodes.

The impact that the communication has on the design of energy-efficient distributed memory organizations has been demonstrated. If shared busses are used as the communication network architecture the energy gains that come from the distribution of the memory organisation quickly disappear due to the energy overhead of the bus. The use of segmented busses allows a further distribution of the memory organisation and, thus, enables more opportunities for reduction of total energy consumption.

Embodiments of the invention include activation or access frequency information to and from resources in a floorplan of a semiconductor device. It is possible that the network power consumption is still higher than it needs be even though the total wirelength is minimum after floorplanners. This is because the wirelength for highly accessed components could be reduced further in length to optimize energy. This would increase other wire lengths but as these have a lower access rate the overall effect is a power consumption reduction. Since segmented bus architectures are also a good alternative approach for the power consumption of the network, the floorplanning approach for energy optimization of the communicating network is adapted for such architectures in embodiments of the present invention. The provided method comprises both architecture optimizations as well as physical design optimizations.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. The scope of the invention is indicated by the appended claims rather than by the foregoing description. All changes that come within the meaning and range of equivalency of the claims are to be embraced within their scope.

What is claimed is:

1. A method of determining an optimized resource interconnection pattern within an essentially semiconductor digital device, said essentially semiconductor digital device comprising resources and being represented by a representation describing the functionality of said digital device, said representation comprising transfers, said transfers being defined by their source resource and their destination resource, said interconnection pattern includes at least one segmented bus temporarily facilitating at least two transfers with partially overlapping scheduling intervals, said at least one segmented bus comprising a switch, said switch defining segments within said at least one segmented bus, said method comprising:
    inputting a representation of the functionality of said essentially digital device, including the number and type of said resources and at least partial scheduling of said transfers;
    performing a first determination of the minimal number of parallel communicating resources and adding virtual switches to essentially all bus segments, said first determination defining a default segmentation; and
    performing a second determination of abstract or relative positions of said resources within said essentially digital device, and at least fixing the amount of switches and the place of said switches, by selectively removing virtual switches, said second determination resulting in a refinement of said default segmentation.

2. The method of claim 1, wherein said representation is a Register-Transfer Level description.

3. The method of claim 1, wherein said representation is an Extended Conflict Graph description.

4. The method of claim 1, wherein the first determination includes resource ordering based on the access activity of said resources, said resource ordering thereby generating topological relationships.

5. The method of claim 4, wherein after resource ordering, determining control aspects of said switches.

6. The method of claim 5, further comprising determining an estimated resource interconnection pattern and wherein said determining control aspects of said switches is based on wire lengths based on said estimated resource interconnection pattern.

7. The method of claim 1 further comprising performing buffer allocation and sizing of said buffers such that said buffers drive said at least one segmented bus and optimize energy consumption of said essentially semiconductor digital device.

8. The method of claim 7, further comprising performing after said buffer allocation step a place and route step.

9. The method of claim 1 wherein said second determination comprises grouping resources in at least two clusters, based on the access activity of said resources.

10. The method of claim 9, wherein block ordering is adapted for enabling groupings with low access activity between said groupings.

11. The method of claim 1, wherein determining abstract or relative positions of resources is performed on at least two hierarchical levels.

12. The method of claim 11, wherein determining abstract or relative positions is based on the access activity of said resources and at least estimated wire lengths while optimizing a cost criterion at least including resource interconnection power consumption cost.

13. The method of claim 1, wherein removing virtual switches is based on comparing the resource interconnect pattern power consumption gain due to said switches with the power consumption overhead introduced by said switches.

14. A computer based system for determining an optimized resource interconnection pattern within an essentially semiconductor digital device, said essentially semiconductor digital device comprising resources and being represented by a representation describing the functionality of said digital device, said representation comprising transfers, said transfers being defined by their source resource and their destination resource, said interconnection pattern includes at least one segmented bus temporarily facilitating at least two transfers with partially overlapping scheduling intervals, said at least one segmented bus comprising a switch, said switch defining segments within said at least one segmented bus, said system comprising:
    means for receiving a representation of the functionality of said essentially digital device, including the number and type of said resources and at least partial scheduling of said transfers;
    means for performing a first determination of the minimal number of parallel communicating resources and adding virtual switches to essentially all bus segments said first determination defining a default segmentation; and
    means for performing a second determination of abstract or relative positions of said resources within said essentially digital device, and at least fixing the amount of switches and the place of said switches, by selectively removing virtual switches, said second determination resulting in a refinement of said default segmentation.

15. A computer based system for determining an optimized resource interconnection pattern within an essentially digital device, comprising resources, said essentially digital device being represented by a representation describing the functionality of said digital device, said representation comprising transfers, defined by their source resource and their destination resource, said interconnection pattern including at least one segmented bus temporarily facilitating at least two transfers with partially overplant scheduling intervals, said system comprising:
   means for receiving a representation of the functionality of said essentially digital device, including the number and type of said resources and at least partial scheduling of said transfers; and
   means for determining optimized segmented information while optimizing a cost criterion at least including resource interconnection power consumption cost, said optimized segmented information being based on an estimation of the frequency of access for said resources and containing abstract or relative positions of said resources within said essentially digital device.

16. A system for determining an optimized resource interconnection pattern within an essentially digital semiconductor device, comprising of resources, said essentially digital device being represented by a representation describing the functionality of said digital device, said representation comprising transfers, defined by their source resource and their destination resource, said interconnection pattern includes at least one segmented bus temporarily facilitating at least two transfers with partially overlapping scheduling intervals, said system comprising:
   means for receiving a representation of the functionality of said essentially digital device, including the number and type of said resources and at least partial scheduling of said transfers;
   means for performing resource ordering to thereby generate topological relationships between the resources, based on a estmation of the freqency of access for said resource; and
   means for determining abstract or relative positions of said resources within said essentially digital device based on said topological relationships.

17. A digital storage device having a software product for execution on a computer system, the software product providing means for determining an optimized resource interconnection pattern within an essentially semiconductor digital device, said essentially semiconductor digital device comprising resources and being represented by a representation describing the functionality of said digital device, said representation comprising transfers, said transfers being defined by their source resource and their destination resource, said interconnection pattern includes at least one segmented bus temporarily facilitating at least two transfers with partially overlapping scheduling intervals, said at least one segmented bus comprising a switch, said switch defining segments within said at least one segmented bus, said software product further comprising:
   means for receiving a representation of the functionality of said essentially digital device, including the number and type of said resources and at least partial scheduling of said transfers;
   means for performing a first determination of the minimal number of parallel communicating resources and adding virtual switches to essentially all bus segments, said first determination defining a default segmentation; and
   means for performing a second determination of abstract or relative positions of said resources within said essentially digital device, and at least fixing the amount of switches and the place of said switches, by selectively removing virtual switches, said second determination resulting in a refinement of said default segmentation.

18. The system of claim 15, wherein the optimized segmented information comprises final switch decisions.

* * * * *

UNITED STATES PATENT AND TRADEMARK OFFICE
CERTIFICATE OF CORRECTION

PATENT NO.       : 7,216,326 B2
APPLICATION NO.  : 10/872966
DATED            : May 8, 2007
INVENTOR(S)      : Papanikolaou et al.

It is certified that error appears in the above-identified patent and that said Letters Patent is hereby corrected as shown below:

Title Page, Column 1 Item [73] (Assignee), Line 1, Delete "Interuniversitar" and insert -- Interuniversitair --, therefor.

At column 1, line 11, Delete "10/128629" and insert -- 10/128,629 --, therefor.

At column 1, line 13, Delete "60/285822," and insert -- 60/285,822, --, therefor.

At column 1, line 16, Delete "60/580788" and insert -- 60/580,788 --, therefor.

At column 1, line 67, Delete "sysystems," and insert -- systems, --, therefor.

At column 9, line 27 (Approx.), Delete "10,128,629," and insert -- 10/128,629, --, therefor.

At column 10, line 8 (Approx.), Delete "Bblock" and insert -- block --, therefor.

At column 11, line 64, Delete "activitation" and insert -- activation --, therefor.

At column 12, line 7, Delete "Conf" and insert -- Conf. --, therefor.

At column 12, line 47, Delete "informationa" and insert -- information --, therefor.

At column 13, line 24, Delete "sinlge" and insert -- single --, therefor.

At column 22, lines 12-13, in Claim 6, after "resource" delete "interconnection pattern and wherein said determining control aspects of said switches".

At column 22, line 62, in Claim 14, delete "segments" and insert -- segments, --, therefor.

At column 23, line 12, in Claim 15, delete "overplant" and insert -- overlapping --, therefor.

At column 23, line 27, in Claim 16, after "comprising" delete "of".

At column 23, line 40, in Claim 16, delete "resources," and insert -- resources --, therefor.

At column 23, line 41, in Claim 16, delete "a estmation" and insert -- an estimation --, therefor.

UNITED STATES PATENT AND TRADEMARK OFFICE
CERTIFICATE OF CORRECTION

PATENT NO. : 7,216,326 B2
APPLICATION NO. : 10/872966
DATED : May 8, 2007
INVENTOR(S) : Papanikolaou et al.

It is certified that error appears in the above-identified patent and that said Letters Patent is hereby corrected as shown below:

At column 23, line 41, in Claim 16, delete "freqency" and insert -- frequency --, therefor.

At column 23, line 42, in Claim 16, delete "resource;" and insert -- resources; --, therefor.

Signed and Sealed this

Sixth Day of November, 2007

JON W. DUDAS
*Director of the United States Patent and Trademark Office*